(12) United States Patent
Naito et al.

(10) Patent No.: US 6,684,487 B2
(45) Date of Patent: Feb. 3, 2004

(54) METHOD OF PRODUCING A LOAD CELL

(75) Inventors: Kazufumi Naito, Shiga (JP); Kenji Imai, Maizuru (JP); Matsuo Zama, Honjyo (JP); Naoki Sasaki, Honjyo (JP)

(73) Assignee: Ishida Co., Shiga (JP)

( * ) Notice: Subject to any disclaimer, the term of this patent is extended or adjusted under 35 U.S.C. 154(b) by 114 days.

(21) Appl. No.: 09/974,802

(22) Filed: Oct. 12, 2001

(65) Prior Publication Data

US 2002/0083578 A1 Jul. 4, 2002

Related U.S. Application Data

(62) Division of application No. 09/135,006, filed on Aug. 17, 1998, now abandoned.

(51) Int. Cl.$^7$ ............................................. H01C 17/28
(52) U.S. Cl. ...................... 29/621.1; 29/620; 29/621; 338/2
(58) Field of Search ................ 29/621.1, 620, 29/621; 73/862.623, 766; 338/2, 308

(56) References Cited

U.S. PATENT DOCUMENTS

| | | |
|---|---|---|
| 4,309,687 A | 1/1982 | Utner et al. |
| 4,325,048 A * | 4/1982 | Zaghi et al. ............... 338/3 |
| 4,432,247 A * | 2/1984 | Takeno et al. ......... 73/862.623 |
| 4,511,877 A * | 4/1985 | Nishikawa et al. ........... 338/2 |
| 5,031,463 A | 7/1991 | Hess |
| 5,052,505 A | 10/1991 | Naito et al. |
| 5,306,873 A | 4/1994 | Suzuki et al. |
| 5,404,124 A | 4/1995 | Ruppin et al. |
| 5,437,195 A | 8/1995 | Bureau et al. |

FOREIGN PATENT DOCUMENTS

| | | |
|---|---|---|
| JP | 4038402 A | 2/1992 |
| JP | 8012101 A | 1/1996 |

* cited by examiner

*Primary Examiner*—Carl J. Arbes
*Assistant Examiner*—Tim Phan
(74) *Attorney, Agent, or Firm*—Shinjyu Global IP Counselors, LLP (57) ABSTRACT

A load cell is constructed with several strain gauges. Each of the strain gauges are formed with a meandering conductive portion on a substrate or base member. Portions of the meandering conductive layer defines a predetermined tab ratio. The base member is formed with a predetermined amount of filler and the tab ratio is pre-determined such that the creep characteristic of the strain gauge is substantially zero in a load cell having a generally low rated load.

2 Claims, 5 Drawing Sheets

METHOD OF PRODUCING A LOAD CELL

This application is a division of U.S. application Ser. No. 09/135,006, filed Aug. 17, 1998 now abandoned, which claims the benefit of Japanese Patent Application No. 9-242140, filed Aug. 22, 1997.

BACKGROUND OF THE INVENTION

A. Field of the Invention

The present invention relates to a load cell used in various lightweight machines or the like, and a method of producing the same.

B. Description of the Related Art

Figure 5:
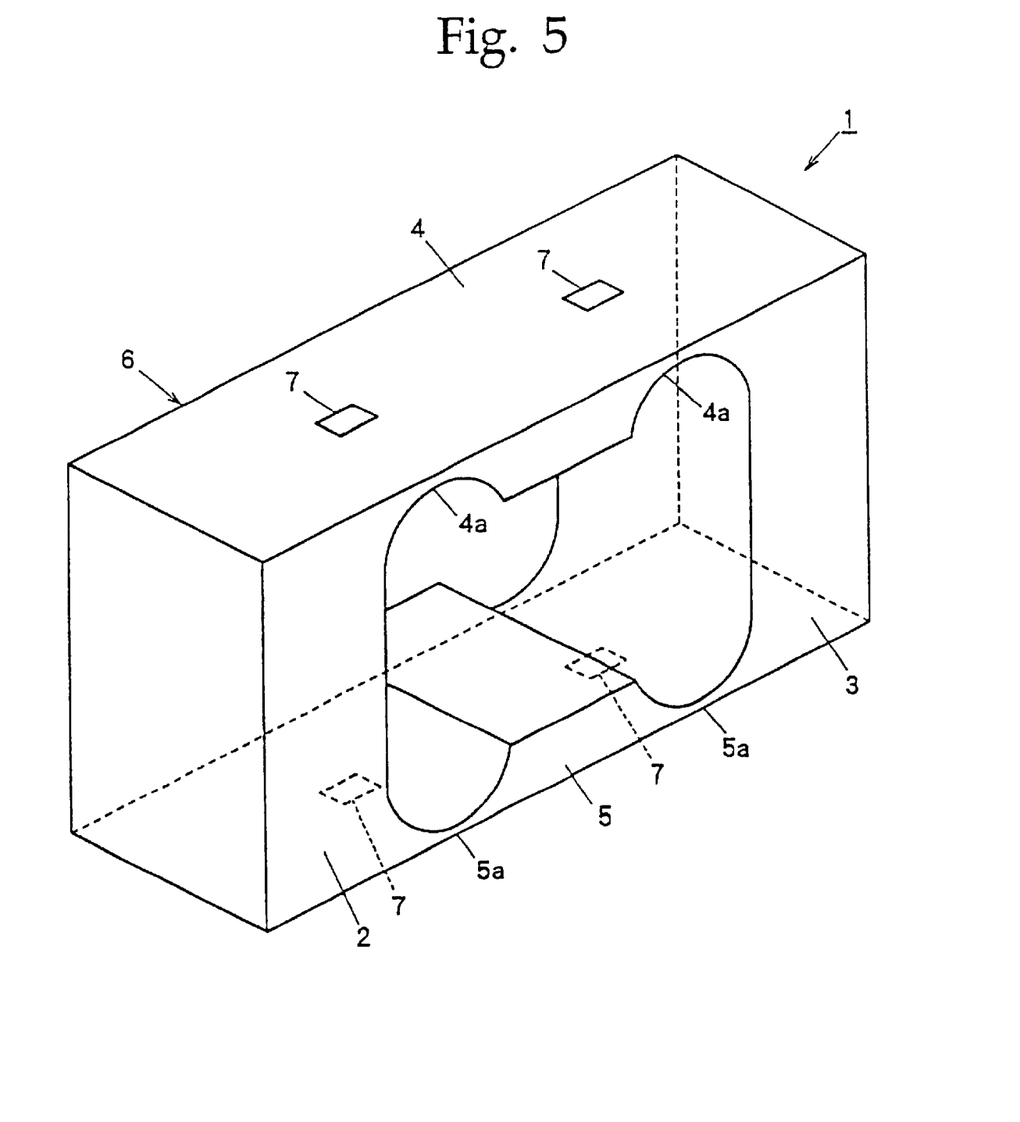
FIG. 5 is a perspective view showing a configuration of a load cell to which strain gauges are attached, the strain gauges being formed in accordance with the present invention.

In general, a load cell 1 used in a weighing machine or the like has a strain generating body 6 similar to that shown in FIG. 5. The strain generating body 6 is formed in a hollow rectangular shape by upper and lower beam portions 4, 5 having a fixed rigid body portion 2, a movable rigid body portion 3 and strain generated portions 4a and 5a having small thickness. Strain gauges 7 are adhered to outer surfaces adjacent to the strain generated portions 4a and 5a of this strain generating body 6, respectively. If load is applied to the strain generating body 6, the movable rigid body portion 3 displaces downward relatively to the fixed rigid body portion 2. With the displacement, compression strain or tensile strain occurs on each of the strain generated portion 4a and 5a, and a load acted is measured by detecting the strain occurred by the strain gauges 7.

Figure 6:
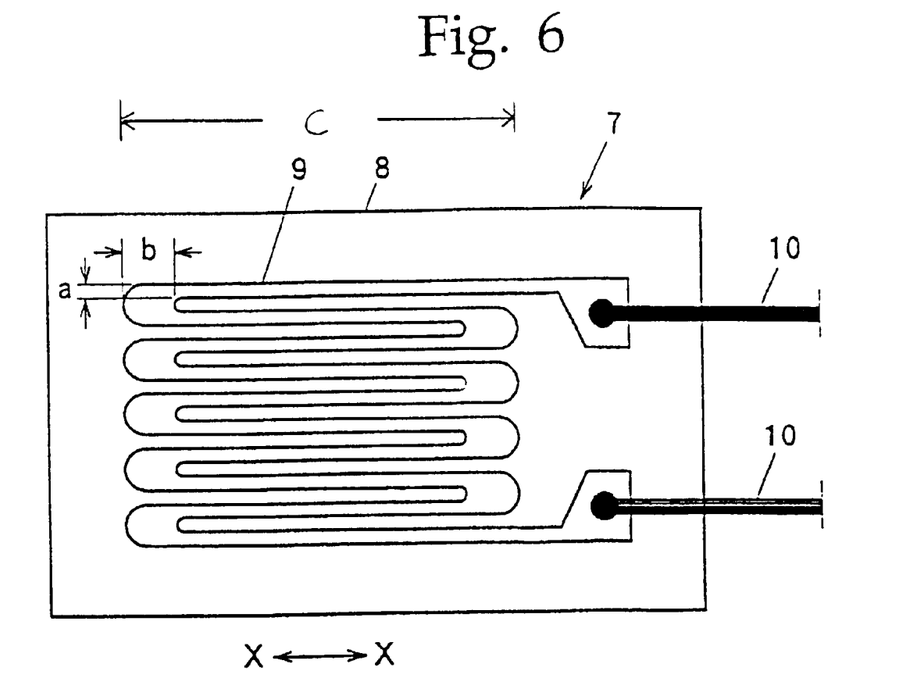
FIG. 6 is an enlarged view of one of the strain gauges attached to the load cell depicted in FIG. 5.

An electric resistance wire type strain gauge is widely used as the strain gauge 7 of the above-mentioned load cell 1. This electric resistance wire type strain gauge 7 is formed such that a resistance wire 9 made of a metal foil is arranged on a base member 8 made of a synthetic resin in a meandering manner, such as is shown in FIG. 6 of the instant application. Lead wires 10 are connected to the opposite end portions of the resistance wire 9 by, for example, soldering. The strain gauge 7 expands or contracts in X—X direction in accordance with strain generated on the surface of the strain generated portions 4a and 5a of the strain generating body 6, whereby resistance value of the resistance wire 9 is increased or decreased. Therefore, the magnitude of strain can be detected by monitoring the resistance value.

In the load cell having the above-mentioned structure, it is generally very difficult to prevent a phenomenon known as creep from occurring on the above structure. Creep is a phenomenon in which when a constant load is applied to a strain generating body 6, a measured output value from a strain gauge varies over an elapsed time period starting from the point at which a load is placed. The creep phenomenon is caused for a variety of reasons relating to the elasticity and configuration of the strain generating body, the strain gauge, an adhesive which adheres the strain gauge to the strain generating body, and a coating material included on the strain gauge to protect an electric circuit.

The creep phenomenon has a tendency to reduce the output value over a long period of time in the case where the load cell has a large load applied thereto (relative to the weight capacity rating of the load cell). Further, the creep phenomenon is such that with a small load applied to the load cell (relative to the weight capacity rating of the load cell) the output value increases over a long period of time. In either case, it is an important objective to improve accuracy of the load cell or a weighing machine to suppress this creep phenomenon as much as possible.

Conventionally, the creep characteristic has been partially compensated for by manipulation of a tab ratio defined by the meandering pattern of the resistance wire 9 in a strain gauge. The tab ratio is generally defined as (b/a) where the dimension (b) in X—X direction of a curved portion of the resistance wire 9 is divided by a width dimension (a) perpendicular to X—X direction in the resistance wire 9 as shown in FIG. 6. That is, the effects of the creep phenomenon can be at least partially compensated for by specific adjustments of the tab ratio of the resistance wire of the strain gauge, and also making, in combination therewith, particular changes in shape, dimension of the strain generating body such as thickness and the like of the base member in the strain gauge, and other conditions.

PROBLEM TO BE SOLVED BY THE INVENTION

However, even through the creep characteristic of the load cell is partially compensated for by manipulation of the tab ratio of the strain gauge as described above, the ability of such manipulation of the tab ratio to compensate for the effects of the creep is extremely limited. As mentioned above, since the creep characteristic differs depending on a rated load, it is impossible to optimize the creep characteristic with respect to the load cell having a wide range of a rated load. Further, there are many different design considerations in making a load cell. The weight capacity rating for each load cell makes it necessary to use a strain gauge having a tab ratio that is specific to the load cell weight capacity. Therefore, many different strain gauges must be manufactured, one strain gauge for each type of load cell. Such a design consideration results in increasing costs for production of such strain gauges.

In particular, since the resistance wire of a strain gauge is formed in a predetermined pattern by etching treatment, if it is necessary to produce various kinds of strain gauges having different tab ratios as mentioned above, it is necessary to prepare many masks used during the etching process. As a result, the characteristics are varied due to uneven etching. Further, even with a finely determined tab ratio, many masks must be prepared for each tab. Therefore, consistency in a desired tab ratio cannot always be obtained with good accuracy since such factors as dispersion of the etching, over-etching or under-etching may occur. It is therefore difficult to appropriately control the creep characteristics of every load cell of each rated load by only control of the tab ratio. Further, it is very difficult to adjust creep characteristics by only control of the tab ratio without changing the gauge length and the pattern shape. In particular, with respect to the load cell of low rated load of a rated load of 6 kg or less, it is almost impossible to make the creep characteristic zero by the above described methods.

SUMMARY OF THE INVENTION

Accordingly, one object of the present invention is to provide a load cell in which the effects of creep are essentially minimized if not eliminated. In particular, the object of the present invention is to provide a load cell having low rated load where the effects of creep are substantially zero.

Another object of the present invention is to provide a method of producing a load cell where creep characteristic are substantially reduced or eliminated.

In order to solve the above-mentioned problem, the present invention is characterized by having a strain gauge fixed to a strain generating body. The strain gauge includes a patterned metal foil formed on a base member. The base member is formed from a mixture of a synthetic resin and a small amount of filler and the strain gauge is fixed on a strain generating portion of the strain generating body.

Preferably, the synthetic resin and the filler which form the base member are mixed together so as to define a mixing ratio where the filler is 15 vol % or less of the total volume of the composition forming the base member.

Preferably, the load cell has a rated load of no more than 6 kg includes a strain generating body and a strain gauge.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENTS

As shown in FIGS. 5 and 6, a load cell in accordance with a first aspect of the present invention (hereinafter referred to as first invention) is characterized in that a load cell 1 has a rated load of 6 kg or less and a creep characteristic that is substantially zero. The load cell 1 includes a strain generating body 6 and at least one strain gauge 7 that is formed by patterning a metal foil 9, the metal foil 9 being fixed on a substrate hereinafter referred to as a base member 8. The base member 8 is formed from a mixture of a synthetic resin and a predetermined amount of filler, the strain gauge being fixed proximate a strain generated portion 4a, 5a of the strain generating body 6.

In accordance with another aspect of the present invention, a load cell (hereinafter referred to as the second invention) includes a strain generating body and a strain gauge obtained by patterning a metal foil formed on a base member where the base member is formed from a synthetic resin and a filler. The strain gauge is fixed on a strain generated portion of the strain generating body and is characterized in that the base member is such that the mixing ratio of the filler is 15 vol % or less of the 100 vol % of a composition that includes the synthetic resin and the filler.

In another aspect of the present invention, a method (hereinafter referred to as third invention) for producing a load cell includes mounting, on a strain generating body, a strain gauge obtained by patterning a metal foil formed on a base member where the base member is formed of a synthetic resin and a filler. The strain gauge is fixed on a strain generated portion of the strain generating body and base member is formed by controlling the mixing ratio of the synthetic resin with the filler, thereby making a creep characteristic of the load cell substantially zero.

As well, the method of producing a load cell (hereinafter the fourth invention) includes forming the strain gauge of a resistance wire arranged in a meandering manner, obtained by patterning a metal foil formed on a base member. The base member includes a synthetic resin and a filler. The strain gauge is fixed on a strain generated portion of the strain generating body. The base member is formed by mixing synthetic resin and filler where the filler is about 15% of the total volume of the filler thereby making a creep characteristic of the load cell substantially zero.

EXAMPLES OF THE PRESENT INVENTION

The base member 8 in any strain gauge is typically made from an electrically insulating material. In making such a base member, it is possible to use various kinds of synthetic resins which serve as then electrically insulating material. In particular, polyimide resin is preferable and includes a variety of polyimide type resins such as polyamide-imide resins. Further, various fillers such as alumina, silica, silicon nitride, boron nitride, mica, and the like, which are used in electrically insulating materials, can be used alone or in a mixture thereof as the above-mentioned filler.

Blending the above-mentioned synthetic resin with filler is conducted by mixing a predetermined amount of filler powder with a pre-polymer solution of the resin, followed by stirring, thereby uniformly blending the mixture, and the blend obtained is molded into a generally uniform thickness sheet, while curing the resin under heating, thereby obtaining the base member. To this base member is adhered or press-adhered under heating a metal foil such as an alloy copper-nickel, nickel-chromium or the like, and thereafter, by patterning the metal foil, a strain gauge is formed. The strain gauge is patterned by, for instance, etching, defining the meandering pattern similar to that depicted in FIG. 6. The surface of the strain gauge may also be coated with a polymer such as butadiene rubber, isoprene rubber or polyimide.

In conventional or prior art strain gauges, the filler is mixed with the synthetic resin in an amount of about 20 vol % (relative to 100 vol % of composition of the resin and the filler) in order for the coefficient of thermal expansion of the synthetic resin base member to correspond generally to the coefficient of thermal expansion of a metal constituting the strain gauge. Consequently, in most prior art configurations or conventional strain gauges, the filler content of a base member is typically about 20% by volume.

The present inventors have achieved the present invention by obtaining a surprising finding that the filler amount has a direct relationship to creep characteristics of the strain gauge. In particular, the inventors have discovered that by reducing the amount of the filler to a smaller amount, specifically, to about 15 vol % or less, and preferably 10 vol % or less, the creep ratio can be brought close to zero with respect to a load cell having a low rated load such as a rated load of 6 kg or less in the case where a strain gauge has a length of 3 mm (dimension C in FIG. 6). Such creep characteristics have not been attained in the prior art.

In accordance with the present invention, the mixing amount of the filler has been determined such that the creep characteristic is effectively zero or very close thereto. However, the inventors have discovered that the appropriate mixing amount varies depending on the rated load of a desired load cell. Therefore, in order to make the creep characteristic zero with respect to a load cell rated for a small load, the mixing amount of the filler must be smaller than the 20% typically employed in conventional strain gauges. Some percentage amounts of filler have been determined by the inventors, as is shown below:

TABLE I

| Gauge Rated load | Mixing amount of filler |
|---|---|
| 3 kg | 10 vol % |
| 1.2 kg | 5 vol % |
| 0.75 kg | 2.5 vol % |

The relationship between the filler amount and the rated load may also vary depending on the type of synthetic resin used, the type of filler, the type of metal foil, or the like, and must be determined for each combination of materials used. Therefore, the determination must be made according to the individual cases, but as mentioned above, the filler amount in the present invention differs greatly from the filler amount in the prior art. Further the prior art does not acknowledge that the amount of filler can assist in generally eliminating the effects of creep on load cell output. Indeed, the prior art does not appear to make any connection between filler amount and creep.

Accordingly, in the present invention the coefficient of thermal expansion rates of the metal foil and the synthetic resin base member differ. However, when the metal foil is patterned, the patterning is conducted without warpage in the state where a base member to which the metal foil is adhered is preliminarily fixed to a base or the like or is set in a frame. However, after formation of the patterned strain gauge from the metal foil, the base member (and patterned metal foil) is taken out of or off of the base, whereby a strain gauge can be produced without undergoing the effects of warpage. Thereafter, the strain gauge thus obtained is mounted on the strain generating body by conventional methods, such as adhering with an adhesive.

By the above structure, according to the present invention, the following functions can be obtained.

According to the first invention, a load cell having the creep characteristic of substantially zero is obtained as a load cell comprising a strain gauge fixed to the strain generated portion of the strain generating body. Control of the creep characteristic in this case is possible in accordance with the amount of filler mixed with the above-mentioned base member, and by making the amount small compared to conventional amounts of filler, the creep characteristic can be made substantially zero with respect to a load cell that is low rated load of no more than 6 kg. Also, since control of the creep characteristic can be conducted by adding a different amount of the filler to a molten resin material at the time of molding the base member, production control becomes easy and the creep characteristic can be controlled with reliable accuracy.

Further, according to the second invention, the base member is constituted such that the mixing ratio of the filler is 15 vol % or less relative to 100 vol % of a composition comprising the synthetic resin and the filler, so that it is possible to make the creep characteristic substantially zero in a load cell having a low rated load.

On the other hand, according to a method of producing the load cell according to the third invention, the load cell having the creep characteristic of substantially zero can be obtained by controlling the mixing ratio of the synthetic resin constituting the base member of strain gauge with the filler.

Further, according to a method of producing the load cell according to the fourth invention, the load cell having the creep characteristic of substantially zero can be obtained by controlling the mixing ratio of the synthetic resin constituting the base member of strain gauge with the filler, and having a predetermined tab ratio of a meandering metal foil resistance wire formed on the base member.

EXAMPLES

Tests were conducted which confirmed the relationship between the amount of filler contained in the base member of strain gauge and the creep characteristic of the load cell. The tests are explained as a portion of the description of the examples of the present invention.

(1) Example 1

A test was conducted as follows with respect to a plurality of strain gauges using a polyimide as a synthetic resin material of a base member and boron nitride (with an average particle diameter of 1 □) as a filler.

Test Samples

Four different load cells were produced. Each load cell was made with a set of strain gauges where the strain gauges were generally the same basic configuration (such as depicted in FIG. 6), but each set of strain gauges were formed on differing sheet-like base members or substrates. The four types of sheet-like base members were formed with differing mixtures of resin and filler, as follows:

TABLE 2

| Sample | Resin (% vol) | Filler (% vol) | Tab Ratio |
|---|---|---|---|
| 1 | 95 | 5 | 3.74 |
| 2 | 90 | 10 | 3.74 |
| 3 | 85 | 15 | 3.74 |
| 4 | 80 | 20 | 3.74 |

TABLE 2 depicted information about four different samples. Specifically, the four differing mixtures in TABLE 2 were used to produce base members where the base members were composed of 95, 90, 85 and 80 vol % of a polyimide resin blended with 5, 10, 15 and 20 vol % (total of the resin and the filler being 100 vol %), respectively. Metal foil having nickel-chromium as a main component was adhered and fixed onto each subsequently produced base member, and thereafter the metal foil was patterned in the meandering manner depicted in FIG. 6 to form four types of strain gauges, each type of strain gauge being distinguished by the different filler mixture in the base member as set forth in TABLE 2. The thickness of each base member was 25 microns. Further, the filler was a powder of boron nitride.

A series of load cells each having a rated load of 10 kg were constructed, each load cell having one type of strain gauges adhered thereto. Specifically, a first load cell corresponding to Sample 1 was fitted with four strain gauges fixed thereto, each of the four strain gauges having a base member made with the mixture set forth for Sample 1 in TABLE 2. A second load cell was constructed having four strain gauges fixed thereto, each of the four strain gauges on the second load cell being made with a base member having the mixture as set forth for Sample 2 in TABLE 2. Similarly, a third load cell having four strain gauges of Sample 3 and a fourth load cell having four strain gauges of Sample 4 were also constructed and then tested.

The above base members used in the strain gauges were all prepared by adding a predetermined amount of boron nitride powder to a prepolymer solution of commercially available polyimide, followed by stirring, to uniformly blend in the polymer, forming the resulting mixture in a sheet form with 25 micron in thickness, and heating the same to cure the resin.

Sample 4 in TABLE 2 has a filler blending ratio of 20 vol % and is a reference sample corresponding to the conventional (or prior art) base members. Sample 4 was prepared by blending a filler such that each of the formed base members of strain gauges has a coefficient of thermal expansion equivalent to that of the gauge foil as is commonly done in the prior art strain gauge configurations. The Samples 1, 2 and 3 in TABLE 2 having filler blending ratios of 5, 10 and 15 vol %, respectively, were prepared in order to demonstrate how creep ratio is changed by filler content. The tab ratio of the resistance wire in all of the strain gauges, Samples 1, 2, 3 and 4, is 3.74 (a=21.1 micron, b=79.0 micron).

Test Conditions

With respect to each load cell, a load of its rated load (10 kg) was applied for 5 minutes. Readings from the strain gauges on each load cell were taken at the beginning of the 5 minute period and again at the end of the five minute period. The creep ratio was then determined based upon the proportional change between the initial output value and the final output value.

Results

Figure 1:
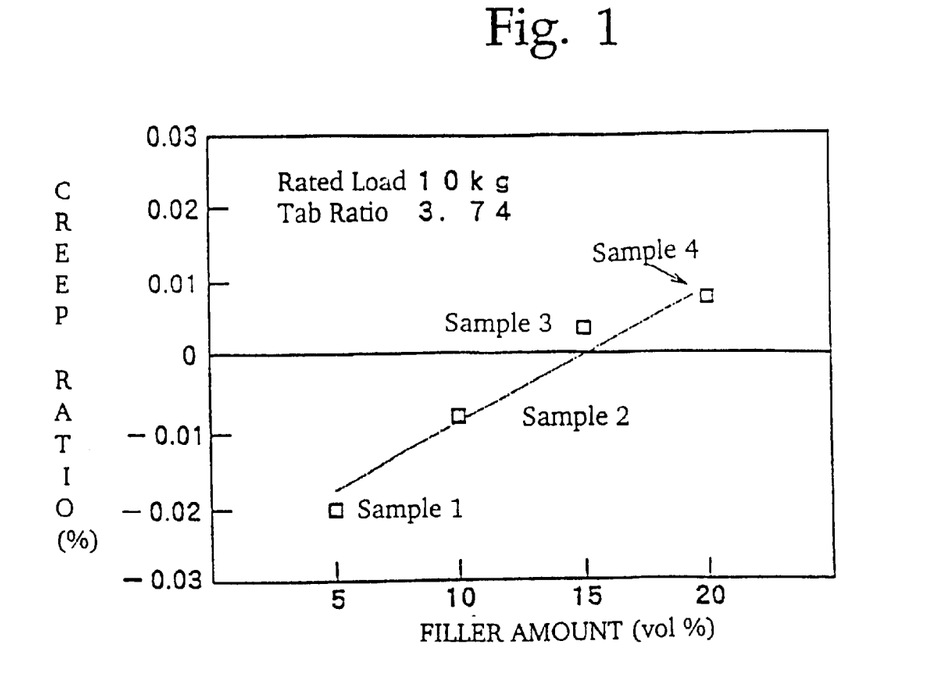
FIG. 1 is a graph showing data collected from tests of Example 1 in accordance with the present invention, where the percentage of filler used in a base member of a strain gauge is varied, tested for creep and depicted with corresponding creep ratio.

The collected data was then used to form the graph shown in FIG. 1. The creep ratio decreases as the mixture percentage of the filler contained in the base member of strain gauge is reduced. In particular, negative creep was observed in Samples 1 and 2 where the filler was at 5 vol % and 10 vol %, respectively. More significantly, the creep ratio was substantially zero at about 15 vol %.

Samples having the filler percentage of volume smaller than the conventional sample (Sample 4) also have a coefficient of thermal expansion that is higher than the gauge foil. Consequently, a problem might arise in that the base member may warp when the gauge foil is fixed thereto by adhesion. However, as described above, the inventors confirmed that since formation of gauge pattern can be made without warpage by preliminarily fixing the base member to a frame or support, there is no practical problem. The gauges are released from the frame or support after formation of the meandering gauge pattern and the gauge pattern obtained is subsequently mounted on the strain generating body, thereby obtaining a load cell.

(2) Reference Example

Another experiment was conducted with regard to the present invention. The base member material produced in Sample 4, as noted above, corresponds to conventional base member support material for strain gauges. A Sample 5 was produced using the same base member material as specified in Sample 4 in TABLE 2. The Sample 5 was tested along with Sample 4 to confirm how the creep ratio is changed when the tab ratio of the resistance wire of strain gauge is changed as compared with the conventional sample.

Test Samples

In Sample 4, as discussed above, the load cell had a rated load of 10 kg, and the strain gauges were produced with a tab ratio of resistance wire of 3.74 (a=21.1 micron, b=79.0 micron). Sample 5 was produced with a tab ratio of 2.49 (a=19.5 micron, b=48.5 micron). The mixing ratio of the filler in the base member in each of Sample 4 and Sample 5 was each 20 vol %.

The synthetic resin material of the base members in Samples 4 and 5 was a polyimide resin, and its thickness is 25 microns, similar to the samples listed in TABLE 2. Further, the filler contained is a powder of boron nitride.

Test Conditions

The test conditions were the same as in the above where Samples 1, 2, 3 and 4 were tested. Specifically, Samples 4 and 5 were subjected to a load for 5 minutes. The measurement at the beginning of the time period was compared with the measurement at the end of the time period to produce the data depicted in FIG. 2.

Results

Figure 2:
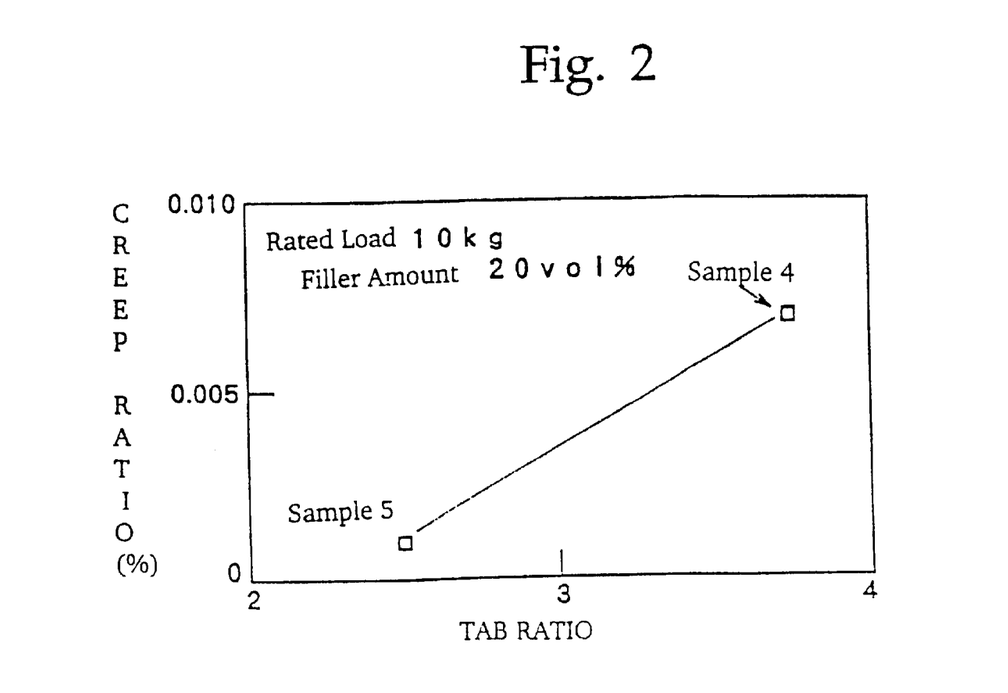
FIG. 2 is a graph showing tab ratio and creep ratio data taken from tests performed on a test sample in accordance with the present invention.

The results of the test are shown in FIG. 2. It was confirmed that the creep ratio decreased along with a decrease of the tab ratio. It should be noted that the measured creep ratio did not achieve or correspond to zero creep or minus creep.

(3) Example 2

Test Samples

Further samples were prepared having the proportions and features listed in TABLE 3. Specifically, load cell samples were produced having respective rated loads of 1 kg, 2 kg, 4 kg, 6 kg, 10 kg, 50 kg and 100 kg, using strain gauges having the filler blending ratio of 20 vol % in the base member and the tab ratio of resistance wire of 3.74 (a=21.1 micron, b=79.0 micron). Further, samples were constructed using strain gauges made with base members having a filler blending ratio of 10 vol % in the base member and a tab ratio of resistance wire of 2.49 (a=19.5 microns, b=48.5 microns). The particulars of the two groups of samples mentioned above are set forth in TABLE 3 below:

TABLE 3

LOAD CELL SAMPLES RATED AS LISTED
WITH STRAIN GAUGES HAVING BASE MEMBERS AS INDICATED

| Resin (%) | Filler (%) | Tab Ratio | Load Rating |
|---|---|---|---|
| 80 | 20 | 3.74 | 1 kg |
| 80 | 20 | 3.74 | 2 kg |
| 80 | 20 | 3.74 | 4 kg |
| 80 | 20 | 3.74 | 6 kg |
| 80 | 20 | 3.74 | 10 kg |
| 80 | 20 | 3.74 | 50 kg |
| 80 | 20 | 3.74 | 100 kg |
| 90 | 10 | 2.49 | 1 kg |
| 90 | 10 | 2.49 | 2 kg |
| 90 | 10 | 2.49 | 4 kg |
| 90 | 10 | 2.49 | 6 kg |
| 90 | 10 | 2.49 | 10 kg |
| 90 | 10 | 2.49 | 50 kg |
| 90 | 10 | 2.49 | 100 kg |

The first seven test samples in TABLE 3 are similar to the Sample 4 in Example 1 in that the filler was mixed at 20% of the total volume of the base member and have the same tab ratio of 3.74. The first seven samples in TABLE 3 are conventional samples (or reference samples). As well, the first seven samples in TABLE 3 included strain gauges coated with a butadiene rubber. It should be noted that Sample 4, discussed above in Example 1 was not coated with butadiene rubber.

The last seven samples listed in TABLE 3 include strain gauges that have base members formed with filler content of 10% and the tab ratio 2.49 so as to make the creep ratio smaller than that of the conventional samples (the first seven samples).

Matrix and thickness of the base member and material of the filler is common to each strain gauge on each of the various load cells.

Test Conditions

A load corresponding to the rated load of each load cell was applied to each load cell for five minutes. The output of each load cell was read at the beginning of the five minute time period and again at the end of the five minute period. The two readings were compared to determine the creep ratio.

Results

Figure 3:
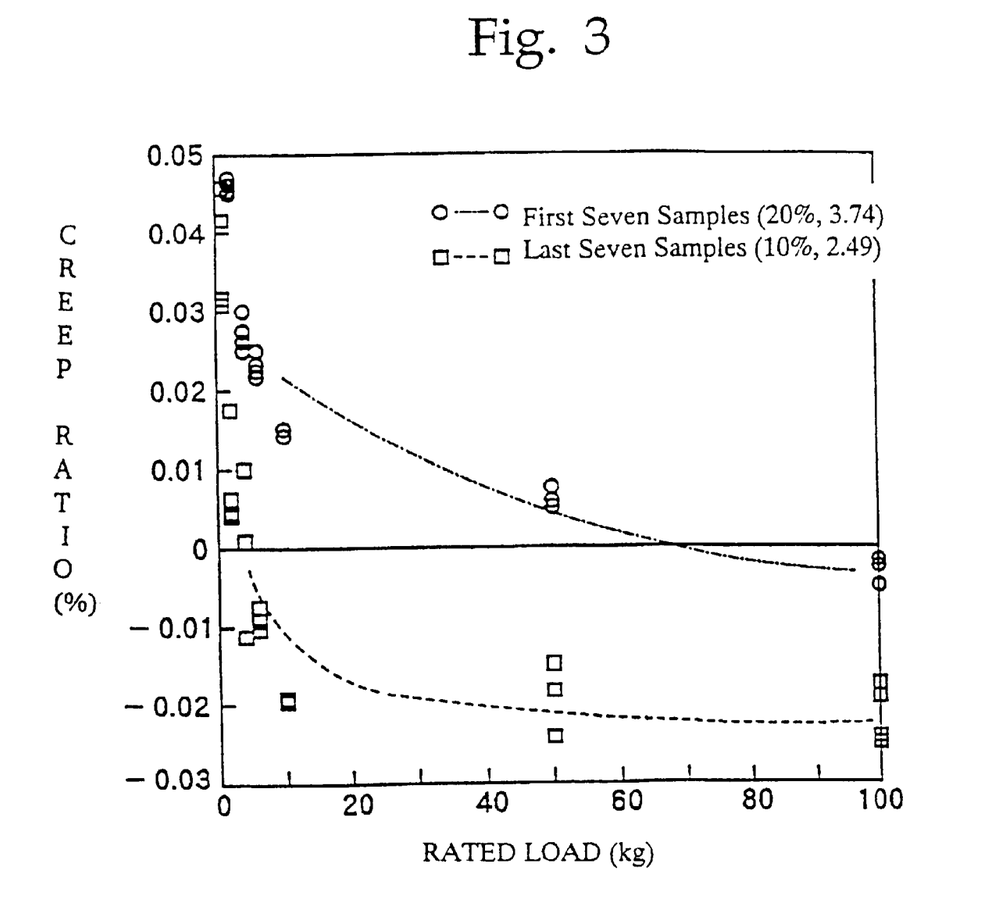
FIG. 3 is a graph showing data collected from test in Example 2 in accordance with the present invention.
Figure 4:
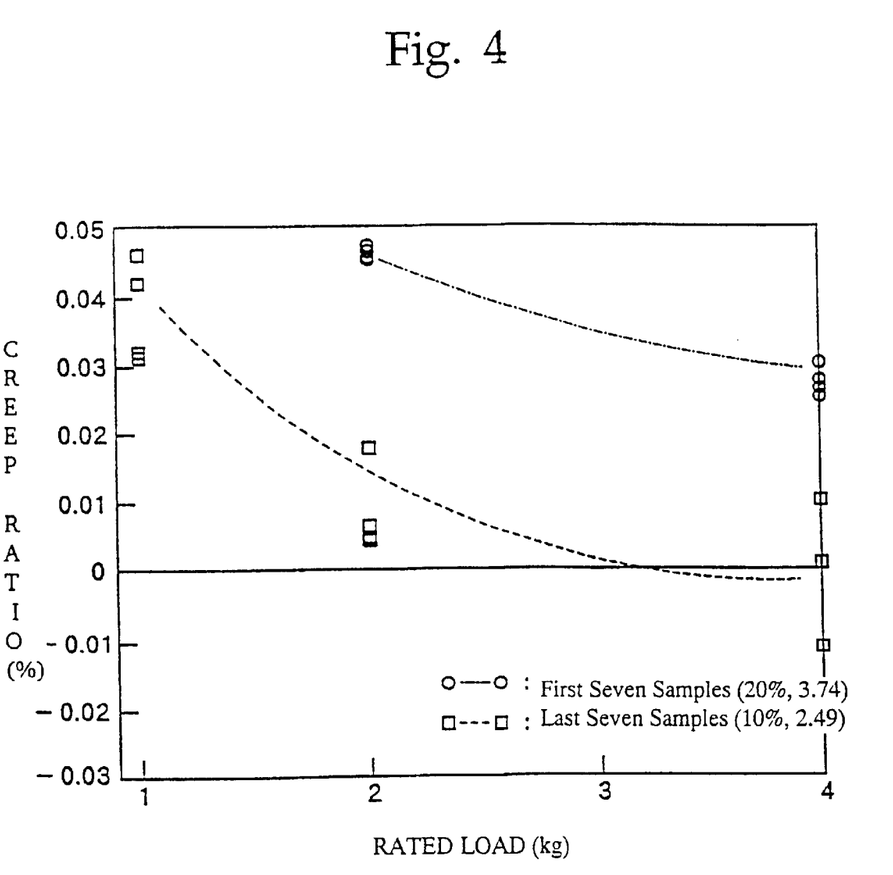
FIG. 4 is a graph showing a portion of the graph depicted in FIG. 3, on a slightly enlarged scale.

The results of the tests are shown in FIG. 3. In FIG. 3, data obtained from tests on the conventional samples (the first seven samples listed in TABLE 3) are depicted with the symbol □. Data obtained from the test samples (last seven samples listed in TABLE 3) are depicted with the symbol □. By comparing the data obtained from testing the conventional and test samples, it was confirmed that creep ratios in the test samples made in accordance with the present invention are lower in value in the entire range of rated loads when compared with the creep ratio of the conventional samples. In particular, as shown in the enlarged dimensions in FIG. 4, in the data from the test samples (last seven samples of TABLE 3) the curve extrapolated from the data indicates that creep ratios go from positive to negative between in the range of rated loads between 2 and 4 kg. Therefore, a load cell having a creep ratio that is substantially zero is realizable at a rated load of 3 kg.

Further, the data collected from the conventional samples (first seven samples in TABLE 3 marked with □ in FIGS. 3 and 4) indicate that the creep ratio goes from positive to negative between the rated loads of 50 kg and 100 kg, and it is therefore presumed that a load cell having the creep ratio of substantially zero is realized at the rated load of 70 kg.

Therefore, as seen from the above-mentioned results, it is presumed that it becomes possible with respect to load cells having rated load of 70 kg to 1 kg to make the creep ratio zero as far as the filler blending ratio decreases to the base member from 20 vol % to 5 vol % and the tab ratio of resistance wire decreases from 3.74 to 2.49.

Effect of the Invention

As mentioned above, according to the first invention of the present invention, the load cell having creep characteristic of substantially zero is obtained as a load cell comprising the strain generating body and the strain gauge having a resistance wire obtained by patterning the metal foil so as to be arranged on the base member made of the synthetic resin, the strain gauge being fixed to a strain generated portion of the strain generating body. Control of creep characteristic in this case is conducted according to the amount of filler mixed with the base member, and by making the amount small the creep characteristic can be substantially zero with respect to a load cell of a low rated load having rated load of 6 kg or less. Further, control of creep characteristic can be attained by modifying amount of filler to a molten resin material at the time of molding the base member. Therefore, in case of producing various load cells having creep characteristics controlled according to the rated load, production control becomes easy, and control can be conducted with good accuracy.

Further, according to the second invention, the base member is constituted such that the mixing ratio of the filler is 15 vol % or less relative to 100 vol % of a composition comprising the synthetic resin and the filler, so that it is possible to make its creep characteristic substantially zero in the above-mentioned a load cell of a low rated load.

Further, according to the method of producing the load cell according to the third invention, the load cell having creep characteristic of substantially zero is obtained by controlling the mixing ratio of the filler and the synthetic resin which constitute the base member of the strain gauge.

Further, according to the method of producing the load cell according to the fourth invention, the load cell having creep characteristic of substantially zero is obtained by controlling the mixing ratio of the synthetic resin constituting the base member of the strain gauge with the filler and the tab ratio of a metal foil resistance wire in a meandering manner formed on the base member.

By the present invention, adjustment of the tab ratio in combination with adjustment of the filler content makes it possible to obtain a creep characteristics of a load cell which is substantially zero.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A method of producing a load cell comprising the steps of:

forming a strain generating body having a strain generating portion;

forming a base member from a mixture of a synthetic resin and a filler;

adhering a metal foil onto the base member;

forming a meandering pattern from the metal foil to define a strain gauge from the patterned metal foil and the base member;

fixing the strain gauge on the strain generated portion of the strain generating body; and wherein the mixture of the synthetic resin and the filler of the base member is predetermined such that a creep ratio of the load cell is substantially zero.

2. The method as set forth in claim 1, wherein in said meandering pattern forming step, portions of the meandering pattern formed from the metal foil define a tab ratio where the tab ratio is predetermined to make the creep ratio of the load cell substantially zero.

* * * * *

UNITED STATES PATENT AND TRADEMARK OFFICE
CERTIFICATE OF CORRECTION

PATENT NO. : 6,684,487 B2
DATED : February 3, 2004
INVENTOR(S) : Kazufumi Naito et al.

It is certified that error appears in the above-identified patent and that said Letters Patent is hereby corrected as shown below:

<u>Title page,</u>
Item [73], Assignee, "Ishida Co." should read -- Ishida Co., Ltd. --; and -- Alpha Electronics Corp. -- should be indicated as an Assignee.

Signed and Sealed this

Twentieth Day of July, 2004

JON W. DUDAS
*Acting Director of the United States Patent and Trademark Office*